United States Patent [19]

Legros et al.

[11] Patent Number: 4,591,662

[45] Date of Patent: May 27, 1986

[54] TELEPHONE SET-COMPUTER TERMINAL ASSEMBLY WITH A SINGLE DECIMAL KEYBOARD AND A SWITCHABLE LOCAL POWER SUPPLY

[75] Inventors: Michel Legros, Croissy-sur-Seine; Jean Montenot, Bonneville, both of France

[73] Assignee: Horlogerie Photographique Francaise, France

[21] Appl. No.: 623,312

[22] Filed: Jun. 22, 1984

[30] Foreign Application Priority Data

Jun. 30, 1983 [FR] France ............................. 83 11199

[51] Int. Cl.⁴ .......................................... H04M 11/00
[52] U.S. Cl. .................................................. 179/2 DP
[58] Field of Search ............... 179/2 A, 2 AM, 2 C, 179/2 DP, 2 BC, 90 BB, 90 BD, 77

[56] References Cited

U.S. PATENT DOCUMENTS 4,051,326 9/1977 Badagnani et al. ............... 179/2 DP
4,415,774 11/1983 Driver ............................... 179/2 DP
4,417,099 11/1983 Pierce ............................... 179/2 DP
4,506,112 3/1985 Bitsch ............................... 179/2 C X
4,524,244 6/1985 Faggin et al. ..................... 179/2 DP

FOREIGN PATENT DOCUMENTS 3039949 5/1982 Fed. Rep. of Germany ... 179/2 DP
8100658 3/1981 PCT Int'l Appl. ................. 179/2 C Primary Examiner—Keith E. George
Attorney, Agent, or Firm—Ratner & Prestia

[57] ABSTRACT

A telephone set-computer terminal assembly is provided having a single decimal keyboard and a switchable local supply. The telephone interface, connected to the decimal keyboard, is supplied by its line input through a switching relay which connects it at one time to a local power supply of the man-machine interface equipment and at another to the line through a switch depending on whether the line is unlooped or not. The telephone interface is connected to the man-machine interface equipment by message communication lines comprising a galvanic insulation device.

6 Claims, 2 Drawing Figures

TELEPHONE SET-COMPUTER TERMINAL ASSEMBLY WITH A SINGLE DECIMAL KEYBOARD AND A SWITCHABLE LOCAL POWER SUPPLY

BACKGROUND OF THE INVENTION

1. Field of the Invention

The present invention relates to electronic units ensuring on the one hand the function of a telephone set and on the other the functions of a computer terminal.

2. Description of the Prior Art

Telephone sets generally comprise a bell circuit, a telephone interface, a dialling keyboard and a telephone handset. The dialling keyboard comprises on the one hand decimal keys and, on the other, function keys for example for automatic recall of the last number dialled. The telephone interface comprises a first input connected to the dialling or control keyboard, a second input with two conductors connected to the telephone line through switches controlled by the position of the handset, a third input connected to the telephone handset. The telephone interface ensures the functions of transmission over the telephone line of dialling pulses controlled by the dialling or control keyboard, the functions of modulation transmission between the line and the handset, the switching off of the bell modulation circuit during dialling. The telephone interface is supplied by the telephone line alone. When the handset is lifted up, the switches are closed and the power supply is provided by the second input of the telephone interface.

Computer terminals comprise a local power supply connected to the main power supply generally through an insulating transformer. They comprise a keyboard connected to man-machine interface equipment. A part of the keyboard is formed of decimal keys, like the keyboard of the telephone set, another part of the keyboard comprising alphabetic keys and function keys.

Attempts have already been made to couple a telephone set with a computer terminal for providing more especially a single work station offering the possibility, from a keyboard comprising a single decimal part, of dialling telephone numbers or for dialoguing with the computer. Such work stations further provide direct dialogue between the telephone line and the computer. However, the design of such work stations raises a problem of galvanic insulation between the telephone line and main power supply. In fact, the decimal keyboard of the telephone set must be necessarily controlled by the telephone interface, itself supplied with power by the line when the handset is lifted. But the use of this decimal keyboard when the handset is lifted, for controlling the man-machine interface equipment, requires the telephone interface be supplied by a main power supply. When the telephone handset is lifted, the telephone interface then provides an electrical connection between the main power supply and the telephone line, which is incompatible with the insulation requirements of several thousands of volts between the telephone line and the main power supply. This insulation, made compulsory by all the standards relating to telephone apparatus, is intended to withstand the potential differences between the ground of the electrical main power supply and the ground of the telephone line network.

Attempts have been made to solve this problem by providing two separate keyboards, one for the telephone interface and the other for the man-machine interface equipment. That leads to increasing the number of keys and complicating the use of the work station. A composite keyboard has also been proposed comprising a single series of digital keys but two insulated series of switches, one series of which controls the telephone interface and the other the man-machine interface equipment. These constructions lead to complex and expensive devices.

The present invention aims more especially at avoiding the disadvantages of the known devices by proposing a telephone set—computer terminal assembly with a single digital keyboard and ensuring sufficient insulation between the telephone line and the main power supply. A single keyboard, comprising a number of common digital keys managed by the telephone interface, allows equally well dialoguing with the computer or generation of telephone commands.

SUMMARY OF THE INVENTION

To attain these objects as well as others, the present invention provides for supplying the telephone interface permanently by its line input, this input being at one time supplied by a local power supply and insulated from the line when the line is unlooped, at another time connected to the line and insulated from the local power supply when line looping is established; galvanic insulation means permanently provide the insulation between the local power supply and the line, and the telephone interface is connected to the man-machine interface equipment by message communication channels also comprising a galvanic insulation device.

In particular, a silent local power supply will be chosen adapted to the telephone interface. Insulation between the main power supply and the telephone lines is provided by two successive barriers; a first barrier formed by the electric transformer providing insulation from the local power supply and a second barrier formed, on the one hand, by the galvanic insulation device of the message communication channels and, on the other hand, by galvanic insulation means between the local power supply and the telephone line.

According to another feature of the invention, the line input of the telephone interface is connected to the common terminals of a switching relay having two rest-work contacts whose rest terminals are connected to the line through a first switch means and whose work terminals are connected to the local power supply, the switching relay and the first switch means being actuated by control means according to a pre-established sequence depending on the operating phase.

BRIEF DESCRIPTION OF THE DRAWINGS

Other features and advantages of the present invention will be clear from the following description of particular embodiments, made with reference to the accompanying figures in which.

DESCRIPTION OF THE PREFERRED EMBODIMENTS

Figure 1:
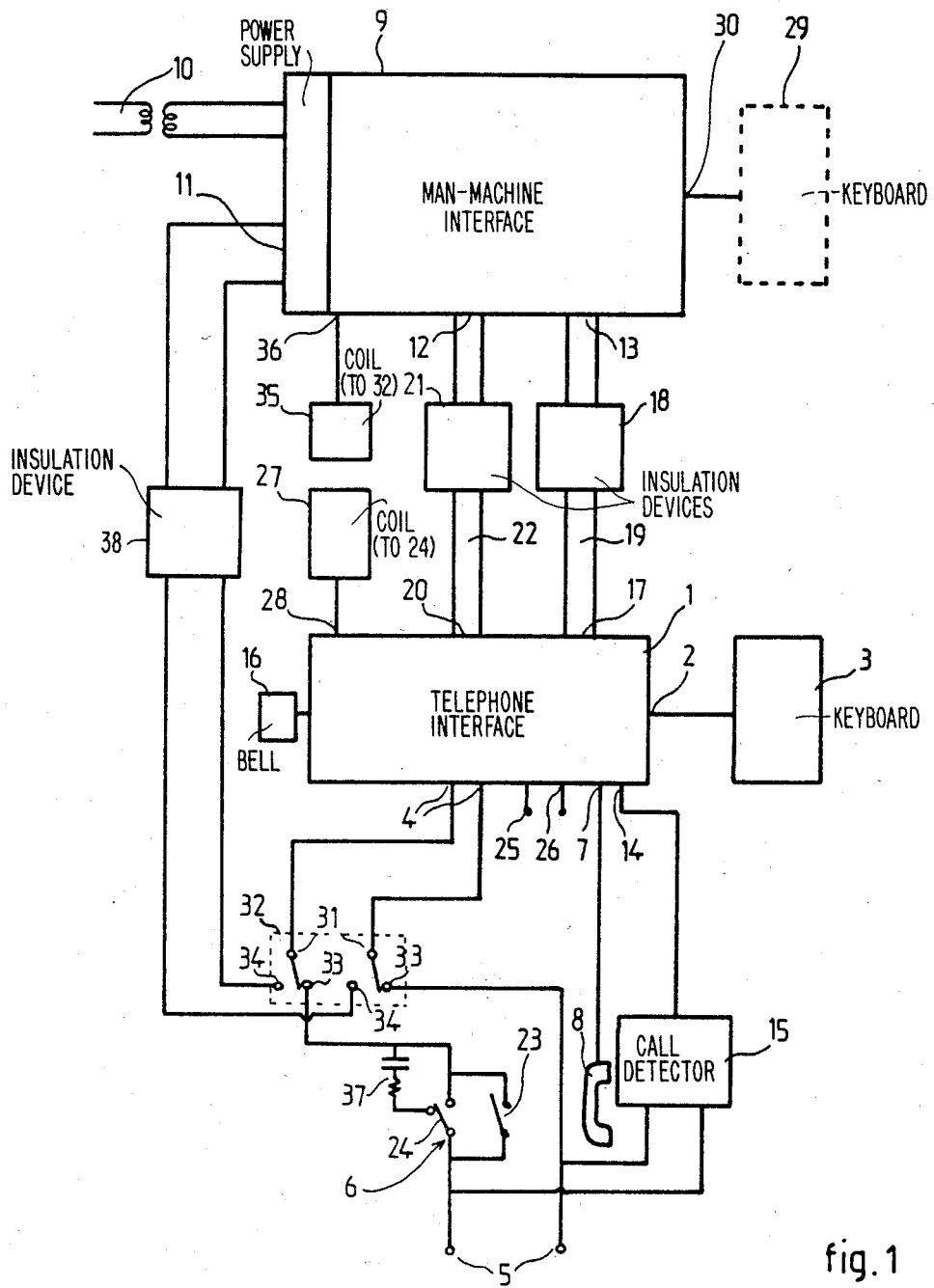
FIG. 1 shows the electrical diagram of a first embodiment of the present invention.

As shown in the figures, the assembly comprises a telephone interface 1, an input 2 of which is connected to a control keyboard 3. Terminal 4, with two conductors, is connected to a telephone line 5 through first switch means 6. Terminal 7 is connected to a telephone handset 8. The telephone interface fulfills, in a way known per se, the usual functions of transmission over the line of dialling pulses controlled by the control keyboard 3, the function of modulation transmission between the line and handset 8, the function of switching off the modulation and bell circuits during dialling.

The telephone interface comprises an input 14, connected to a call detector 15 itself connected to the telephone line 5, the telephone interface 1 causing operation of bell 16 when a call signal is received on the telephone line 5. The call detector 15 is a known device, producing a signal at its output terminal when it receives at its input terminals an AC voltage such as the one produced on line 5 at the time of the telephone call. However, the call detector used for the present invention must be a detector providing galvanic insulation between its input terminals and its output terminals.

The assembly also comprises man-machine interface equipment 9, supplied with power from main power supply 10 through an insulating transformer and a stabilized supply producing a DC voltage. In a preferred embodiment, the man-machine interface equipment is provided with a power supply whose output 11 is capable of being connected to other equipment to be supplied. An input 12 receives control signals coming for example from a control keyboard and an output 13 allows transmission of messages.

The telephone interface 1 comprises an input 17, connected to the output 13 of the man-machine interface equipment 9 through a galvanic insulating device 18 and forming a first transmission channel 19 for transmitting to the telephone interface messages emitted by the man-machine interface equipment.

The telephone interface comprises a first output 20 connected to the input 12 of the man-machine interface equipment 9 through a galvanic insulation device 21 and forming a second transmission channel 22 for transmitting to the man-machine interface means messages emitted or transmitted by the telephone interface 1.

The first switch means 6 comprise a first switch 23 with two stable states operable mechanically by the user, connected in parallel across a relay contact 24. The first switch 23 is operated mechanically either by the handset 8 or by a push-button accessible to the user. A first position detector detects in a way known per se the position of the first switch 23, and a second position detector detects in a way known per se the position of the push-button. The first position detector may for example be a switch, actuated in a way known per se by a handset support. This first detector is connected to a sixth input 25 of the telephone interface 1 and signals the lifted and replaced positions of the handset. The second position detector is connected to a seventh input 26 of the telephone interface 1 for signalling actuation of the push-button, allowing for example the line to be taken without lifting the handset.

The relay contact 24 is controlled by a coil 27 supplied with power by the telephone interface 1 to which it is connected by the output 28.

The control keyboard 3 comprises digital keys and the usual control keys for providing the usual known functions of telephone sets. The assembly of the present invention also comprises alphabetic keys and other function keys for providing the usual use of man-machine interface equipment. These complementary alphabetic and function keys may be either inserted with the digital keys of the keyboard 3 of the telephone interface or grouped in a second keyboard 29 electrically separate from the keyboard 3 and connected to an input 30 of the man-machine interface equipment.

The telephone interface is supplied through its input 4. When line looping is established, the telephone interface is supplied with power by the line. When the line is unlooped, the telephone interface is then supplied with power by a local power supply. A separate local power supply may be used connected to the main supply through an insulating transformer. However, it may be preferred to use the insulating transformer of the man-machine interface equipment, and to supply the telephone interface through the power supply output 11 of the man-machine interface equipment 9. Galvanic insulation means 38 permanently ensure the insulation between line 5 and the local power supply 11. Thus, the insulation between line 5 and main power supply 10 is provided by two successive barriers, the second barrier being the transformer insulating the man-machine interface equipment 9 from the local power supply.

In a first embodiment, shown in FIG. 1, the input 4 of the telephone interface 1 is connected to the common terminals 31 of a switching relay 32 with two restwork contacts whose rest terminals 33 are connected to line 5 through first switch means 6, and whose work terminals 34 are connected to the power supply output 11 of the man-machine interface equipment 9. The contacts of the switching relay 32 are actuated by a coil 35 controlled and supplied with power by the man-machine interface equipment 9 to which it is connected by its output 36. In this embodiment, the switching relay 32 provides at one time the power supply of the telephone interface through the line and its galvanic insulation from the local power supply 11, and at another time the power supply from the local power supply 11 and its galvanic insulation from line 5. Thus, line 5 is permanently insulated from the local power supply 11.

The telephone interfaces usually used for forming keyboard telephone sets generally comprise a microprocessor and programmable logic circuits fulfilling in a way known per se the functions of bell control, of generation and transmission over the telephone lines of dialling signals controlled by the keyboard 3, of modulation transmission between the line and handset 8 and the switching off of the modulation and bell circuits during dialling. The telephone interface of the present invention may be constructed in the same way, but its circuits will have to be programmed so as to further provide the functions of control of the first switch means 6, of control of the switching relay 32 and of transmission over the transmission channels 19 and 22. In particular, the telephone interface must be programmed so as to provide the following functions:

on reception of a signal at the inputs 25 and/or 26 from the position detectors, generating a handset lifted signal transmitted to the man-machine interface by the first output 20;

on reception at the fifth input 17 of a looping order emitted by the man-machine interface equipment, closing the relay contact 24 so as to establish line looping;

on reception at input 26 of an order to take the line without lifting the handset, following a mechanical action of short duration by the user on the corresponding push-button, causing closure of the relay contact 24.

The man-machine interface equipment may be a known device, which is programmable and ensures the usual functions of a computer terminal. It must however be programmed for providing more especially the following additional functions:

on reception at its input 12 of a handset lifted signal emitted by the telephone interface, providing at the output 36 a signal forcing the switching relay 32 to the rest position;

during establishment of the voltage of supply 10, checking that the state of the telephone interface is at rest and, in the affirmative and after a predetermined delay, producing a signal at output 36 for forcing the switching relay 32 into the working position, i.e. establishing the connection between the common terminals 31 and the work terminals 34. Checking the rest state of the telephone interface may be provided in the following way: in the rest state, the telephone interface is either supplied with power by the local supply 11 and emits rest signals over the transmission channel 22, or is not supplied and emits no signal; the man-machine interface equipment detects these rest signals or the absence of signals at its input 12. Another sequence may be provided, for example a signal at the output 13 sent to the telephone interface which replies, if it is supplied with power and at rest, by a rest signal detected at the input 12 by the man-machine interface equipment, and which does not reply if it is not supplied with power, when the main voltage 10 disappears, detection means internal to the man-machine interface equipment generates a signal which is immediately processed by the man-machine interface equipment so as to produce a voltage at the output terminal 36 and immediately force the switching relay 32 into the rest position. This function causes the switching relay 32 to switch rapidly while the local power supply of the man-machine interface equipment has still sufficient energy, accumulated more especially in capacitors, which avoids too slow switching of the switching relay 32, on reception of a handset replaced signal emitted by the telephone interface over the transmission channel 22, emission of a signal at output 36 for forcing the switching relay into the work position and immediately supplying the telephone interface with power from the local power supply 11.

The operation of the device is as follows: in the handset replaced position, and without the line being taken directly, the assembly is supplied by the local power supply of the man-machine interface equipment, the telephone interface being supplied by its second input 4 through the switching relay 32 in the work position. The commands of keyboard 3 are transmitted to the man-machine interface equipment by the second transmission channel 22. Should the main power supply disappear, the switching relay 32 is immediately switched to the rest position, insulating the telephone interface from the man-machine interface equipment. If the main voltage appears again, the man-machine interface equipment causes, after checking of the rest state of the telephone interface, the switching relay 32 to switch to the work position for locally supplying the telephone interface with power. If the handset is lifted or if the line is taken directly, the switching relay 32 is immediately forced to the rest position. If a telephone call is received on line 5, alternating call signals are interpreted by the call detector 15 which produces a bell ringing order at the fourth input 14 of the telephone interface 1. In the case where the telephone interface is not supplied by the local power supply 11, it is then supplied by line 5 through an RC circuit 37 connected in parallel across the first switch means 6.

The galvanic insulation devices 18 and 21 for the transmission channels 19 and 22 may be formed in any known way, and may for example be optical or magnetic coupling devices.

Figure 2:
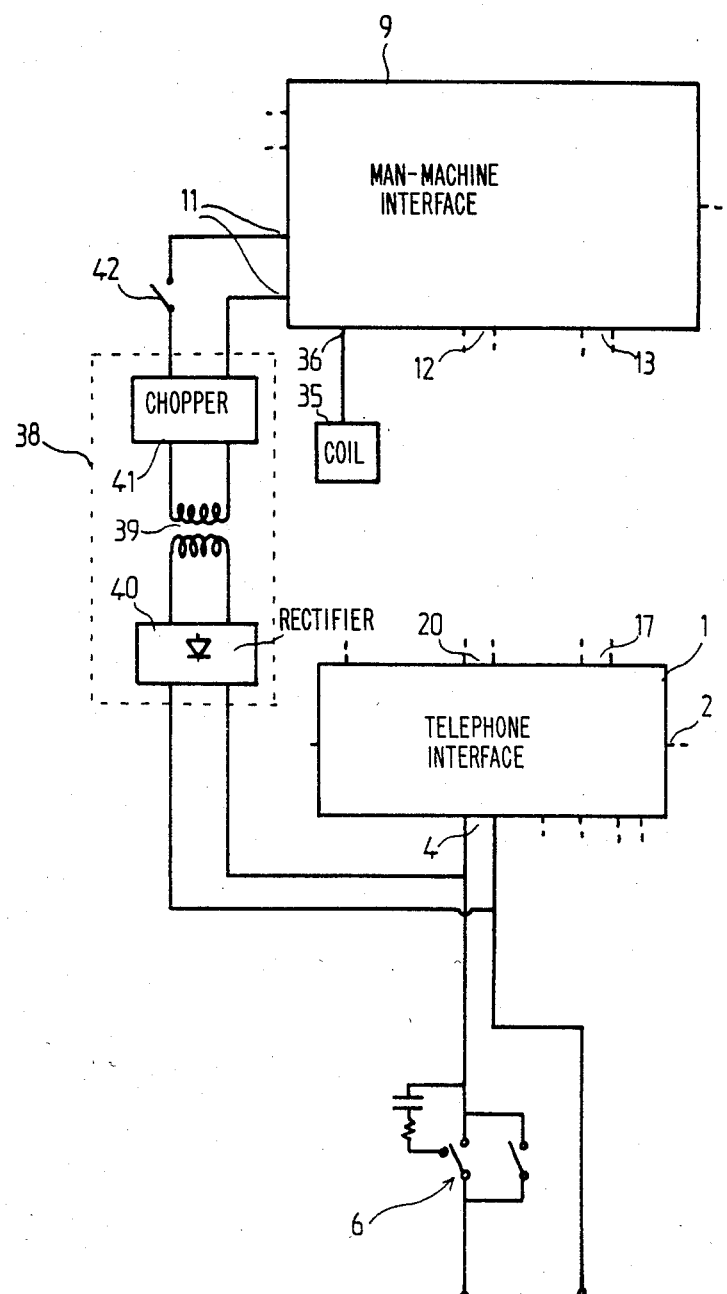
FIG. 2 shows the telephone set-computer terminal assembly of the present invention in a second embodiment.

The telephone interface may be supplied with power according to a second embodiment shown in FIG. 2. In this figure, only the elements which differ from the first embodiment of FIG. 1 have been shown. In this second embodiment, the second input 4 of the telephone interface is permanently connected to the output terminals of the first switch means 6. This second input 4 is also supplied by the local power supply 11 of the man-machine interface equipment through a galvanic insulation device 38. As galvanic insulation device a transformer 39 may for example be used followed by a rectifier 40, the transformer 39 being able to be supplied by a chopper device 41. It is necessary to provide in addition a second relay contact 42, connected in series either to the input or to the output of the galvanic insulation device 38. The second relay contact 42 is actuated by coil 35 supplied from the output 36 of the man-machine interface equipment.

In this second embodiment, the man-machine interface equipment and the telephone interface are programmed so as to leave the second relay contact 42 permanently in the closed position except in the cases where line looping is established. For that, on reception of a signal indicating that the handset has been lifted or that the line has been taken directly, the telephone interface generates a signal transmitted to the man-machine interface equipment which orders opening of the second relay contact 42.

In this second embodiment, the construction of the galvanic insulation device 38 may be simplified by supplying this device with AC power, thus allowing the chopper device 41 to be omitted.

In the first embodiment, and according to another variant, the switching relay 32 may be controlled by a coil supplied with power directly by the telephone interface 1. It is advisable in this case to have an insulated power supply source for supplying the coil of the switching relay 32. The order for switching the switching relay delivered by the man-machine interface equipment is transmitted by the first transmission channel 19 to the telephone interface which causes the switching relay 32 to switch.

The present invention is not limited to the embodiments which have been explicitly described, but includes the different variants and generalizations thereof contained within the scope of the following claims.

What is claimed is:

1. A telephone set-computer terminal assembly comprising
    a telephone interface is connected to a control keyboard, to a telephone line through first switch means and to a telephone handset, the telephone interface generating and emitting signals over the telephone line including dialling signals selected via the control keyboard, the telephone interface further including means for controlling transmission between the line and the handset,
    man-machine interface equipment having a local power supply connected to a main power supply through an insulating transformer in which assembly power for the telephone interface is provided at one time by the telephone line and at another by the local power supply, first galvanic insulation means permanently providing insulation between the local power supply and the telephone line and the telephone interface being connected to the man-machine interface equipment by message transmission channels comprising second galvanic insulation means.

2. The assembly as claimed in claim 1, wherein the telephone interface is alternately connected to the line through first switch means and to the local power supply through the first galvanic insulation means and a series connected second switch means, said first switch means and said second switch means being actuated by control means according to a pre-established sequence.

3. The assembly as claimed in claim 1, wherein the line connection of said telephone interface is connected to terminals of a switching relay having two rest-work contacts whose rest terminals are connected to the line through a switch means and whose work terminals are connected to the local power supply, the switching relay and the switch means being actuated by control means according to a pre-established sequence.

4. The assembly as claimed in claim 3, wherein the switch means comprise a switch with two stable states, actuatable mechanically by the user, connected in parallel across a relay actuated by the telephone interface.

5. The assembly as claimed in claim 4, wherein the switching relay is actuated by the man-machine interface equipment.

6. The assembly as claimed in claim 4, wherein the relay contact is closed by the telephone interface, when the line is taken without lifting the handset, following a mechanical action of short duration by the user on the switch connected in parallel across the relay, and when a looping order is emitted by the man-machine interface equipment and transmitted to the telephone interface.

* * * * *